United States Patent [19]

Davies

[11] Patent Number: 4,841,770
[45] Date of Patent: Jun. 27, 1989

[54] APPARATUS AND METHOD FOR DETERMINING THE AMOUNT OF SUBSTANCE IN A VESSEL

[75] Inventor: Robert L. Davies, Pontypool, United Kingdom

[73] Assignee: Parke-Davis & Co. Ltd., Channel Islands, United Kingdom

[21] Appl. No.: 109,973

[22] Filed: Oct. 19, 1987

[51] Int. Cl.$^4$ ............................................. G01F 23/28
[52] U.S. Cl. .................................. 73/290 V; 33/723; 340/620; 340/621; 367/908
[58] Field of Search ............. 73/290 V, 291; 340/620, 340/621; 33/126.7 A

[56] References Cited

U.S. PATENT DOCUMENTS

| | | | |
|---|---|---|---|
| 2,269,737 | 1/1942 | Rogers | 33/126.7 A |
| 2,394,220 | 2/1946 | Wagner | 33/126.7 A X |
| 2,757,534 | 8/1956 | Jordan et al. | 33/126.7 A X |
| 3,335,334 | 8/1967 | Albisser | 340/620 X |
| 3,909,948 | 10/1975 | Markfelt | 340/620 X |
| 4,123,753 | 10/1978 | Gravert | 340/621 |
| 4,470,299 | 9/1984 | Soltz | 73/290 V |
| 4,663,614 | 5/1987 | Rauchwerger | 340/605 |

Primary Examiner—Daniel M. Yasich
Attorney, Agent, or Firm—Gary M. Nath

[57] ABSTRACT

Apparatus (1) for measuring the amount of a substance (2) in a vessel which comprises a detector means comprising at least two electrodes (3) adopted to generate an electric signal in response to contact of the electrodes with the surface of the substance (2), a first reference point (6) on the detector means which point is a fixed distance from the ends of the electrodes (3) said reference point being provided on a material suitable for reflecting waves from a wave transmitting-receiving device (8) e.g. a sonar device, preferably located in a fixed position above the first reference point for measuring the distance from the first reference point (6) to a second reference point (70) at the wave transmitting-receiving device (8) whereby the amount of the substance (2) in the vessel can be determined by computation, e.g. from knowledge of the height of the vessel to the fixed second reference point, determination of the height from the surface of the liquid to the second reference point and the cross sectional area of the vessel.

13 Claims, 5 Drawing Sheets

APPARATUS AND METHOD FOR DETERMINING THE AMOUNT OF SUBSTANCE IN A VESSEL

BACKGROUND OF THE INVENTION

1. Field of the Invention

This invention relates to apparatus and a method for determining the amount of substance in a vessel.

2. Description of the Prior Art

In the pharmaceutical and allied industries, the vessels in which liquids are processed must be free from bacteria and other undesired organisms. Therefore, it is necessary for the vessels to be as smooth as possible so that sites where such organisms can grow are minimised.

Consequently, it is very difficult to measure the amount of liquid in a vessel. Float chambers at the side of the vessel or sight glasses built into the vessel cannot be used since these would provide sites where cleaning is difficult and undesired micro-organisms could breed and flourish.

Methods have been devised to overcome these problems of measurement. For example, one method includes the use of a tape measure to determine the distance between the surface of the liquid and the top of the vessel. This distance can then be used to calculate the volume of liquid in the vessel.

This method suffers from the disadvantages that the tape measure is sometimes not held vertical, and it is difficult to determine when the end of the tape measure is just in contact with the surface of the liquid. In addition, these errors will be made worse by any reading errors on the tape.

Often, particularly when the liquid is agitated in processing, foam is formed on the surface. This makes measurement by the method described above extremely difficult but also renders measurement by radar or sonar techniques inaccurate as it is difficult to distinguish between foam on the surface of the liquid and the surface itself.

SUMMARY OF THE INVENTION

It is an object of this invention to provide an improved method and apparatus for determining the amount of substance in a vessel.

It is another object of this invention to provide detector means for detecting the position of the surface of a liquid.

According to one aspect of this invention there is provided apparatus for determining the amount of substance in a vessel comprising detector means adapted to detect the surface of the substance, a first reference point provided on the detector means and measuring means adapted to measure the distance from the first reference point to a second reference point having a known position in relation to the vessel whereby the amount of substance in the vessel can be determined.

Advantageously, the detector means comprises at least two electrodes adapted to generate an electrical signal in response to contact of the electrodes with the surface of the substance and may further comprise indicating means in electrical communication with the electrodes, said indicating means being activated in response to the signal generated when the electrodes contact the surface of the substance.

The electrodes may be in electrical communication with to the indicating means by electrical wires. An elongate member may be provided to support the electrodes and, conveniently, the electrical wires are enclosed within the elongate member. The elongate member may be arranged between the electrodes and the indicating means.

The indicating means may comprise a lamp or a meter. When the indicating means comprises a lamp it may be adapted to be actuated when the electrodes contact the surface of the substance. When the indicating means comprises a meter it may be adapted to register when an electrical current is flowing through the meter.

It will be appreciated that the indicating means may comprise any suitable means adapted to indicate when an electric circuit is set up between the electrodes, the substance and the indicating means.

Preferably, the measuring means comprises a wave transmitting device and a wave receiving device. Advantageously, the wave transmitting device and the wave receiving device operate on sound waves.

Preferably the first reference point is provided on a material suitable for reflecting waves from the wave transmitting device to the wave receiving device, whereby the distance between the first reference point and the second reference point can be measured. Desirably the first reference point is spaced at a predetermined distance from the lower ends of the electrodes. Preferably, the first reference point is provided on a reference plate which extends radially from the detector means and may be made of metal or other suitable material.

It will be appreciated that the measuring means may comprise any means suitable for measuring the distance from the reference means to the point spaced from the reference means, for example a tape measure or graduations along the elongate member.

When the measuring means comprises any such suitable means, the reference means may be any chosen point on the detector means.

In one embodiment of this invention the measuring means comprises the indicating means. In this embodiment, the measuring means is activated in response to the signal generated when the electrodes contact the surface of the substance. Also in this embodiment, the indicating means may comprise a digital read-out to provide a reading of the distance from the measuring means to the reference means.

In another embodiment, the indicating means may comprise displacement means to raise and lower the electrodes. In this embodiment, when the electrodes contact the surface of the substance, the displacement stops automatically to indicate that said contact has occurred.

According to another aspect of this invention there is provided detector means for detecting the surface of a substance for use in apparatus as described above, comprising at least two electrodes adapted to generate an electric signal in response to contact of the electrodes with the surface of the substance.

Preferably, the detector means comprises indicating means which may be in electrical communication with the electrodes. The indicating means may be activated in response to the signal generated by contact of the electrodes with the surface of the substance.

Conveniently, the detector means comprises an elongate member which supports the electrodes. The elongate member may be arranged between the electrodes and the indicating means.

The electrical communication between the electrodes and the indicating means may be provided by electrical wires enclosed with the elongate member.

The indicating means may comprise a lamp or a meter or other suitable means.

According to a further aspect of this invention there is provided a method for determining the amount of substance in a vessel comprising the steps of displacing a detector means into the vessel until the surface of the substance is detected, measuring the distance between a first reference point on the detector means to a second reference point at a known position in relation to the vessel whereby the amount of substance in the vessel can be determined.

DESCRIPTION OF THE PREFERRED EMBODIMENTS

Figure 1:
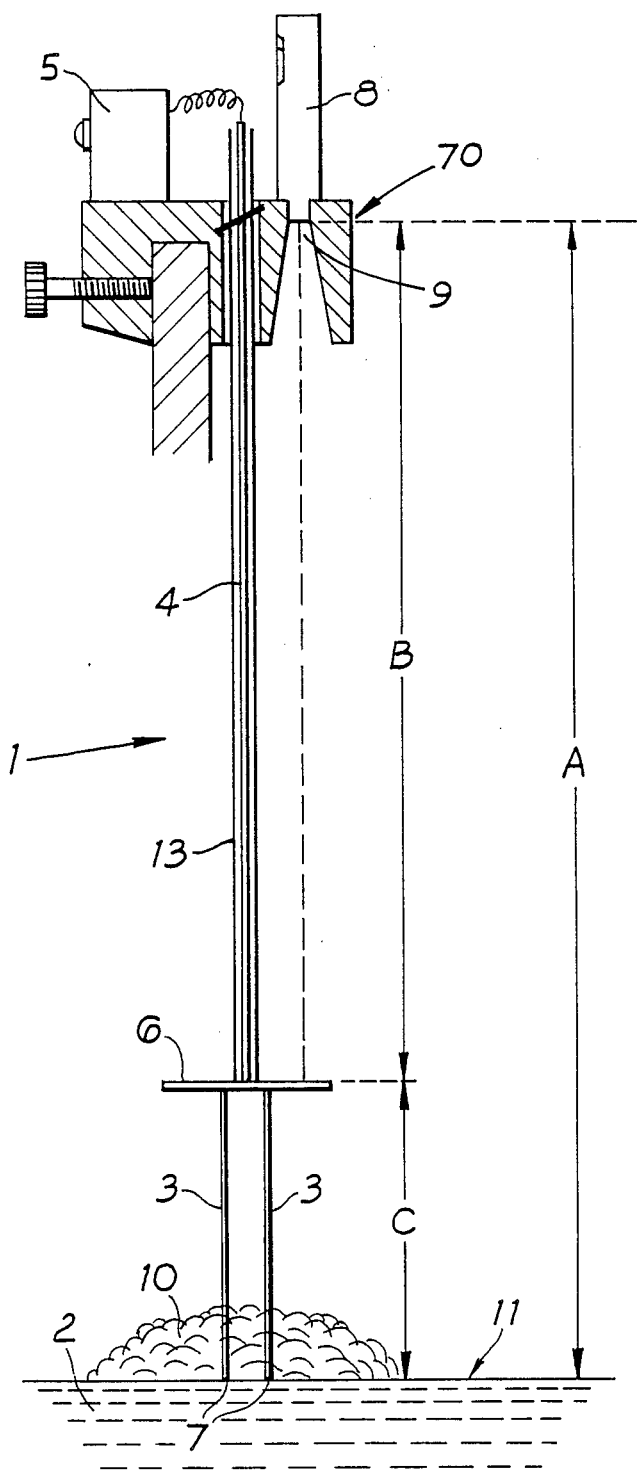
FIG. 1 is a schematic diagram of apparatus in accordance with this invention.

Referring to FIG. 1, a detector means 1 for detecting a surface 11 comprises electrodes 3 connected electrically by wires 4 to indicating means in the form of an indicating lamp 5.

The electrodes are supported by an elongate member, in the form of a tube 13. The tube 13 encloses the wires 4.

A first reference point is provided on a metallic reference plate 6, and is attached to electrodes 3 such that the metallic plate 6 is spaced from the lower ends 7 of electrodes 3 by a predetermined distance C. The plate 6 extends radially from the electrodes 3.

The apparatus for determining the amount of substance in a vessel comprises the above described detector means and also measuring means in the form of sonar 8. The sonar 8 is disposed at a second reference point 70 at a known position in relation to the vessel 100.

The lamp 5 and the sonar 8 are placed in the vicinity of each other at the opening 9 of a vessel 100, for ease of operation. (See FIG. 5).

Figure 5:
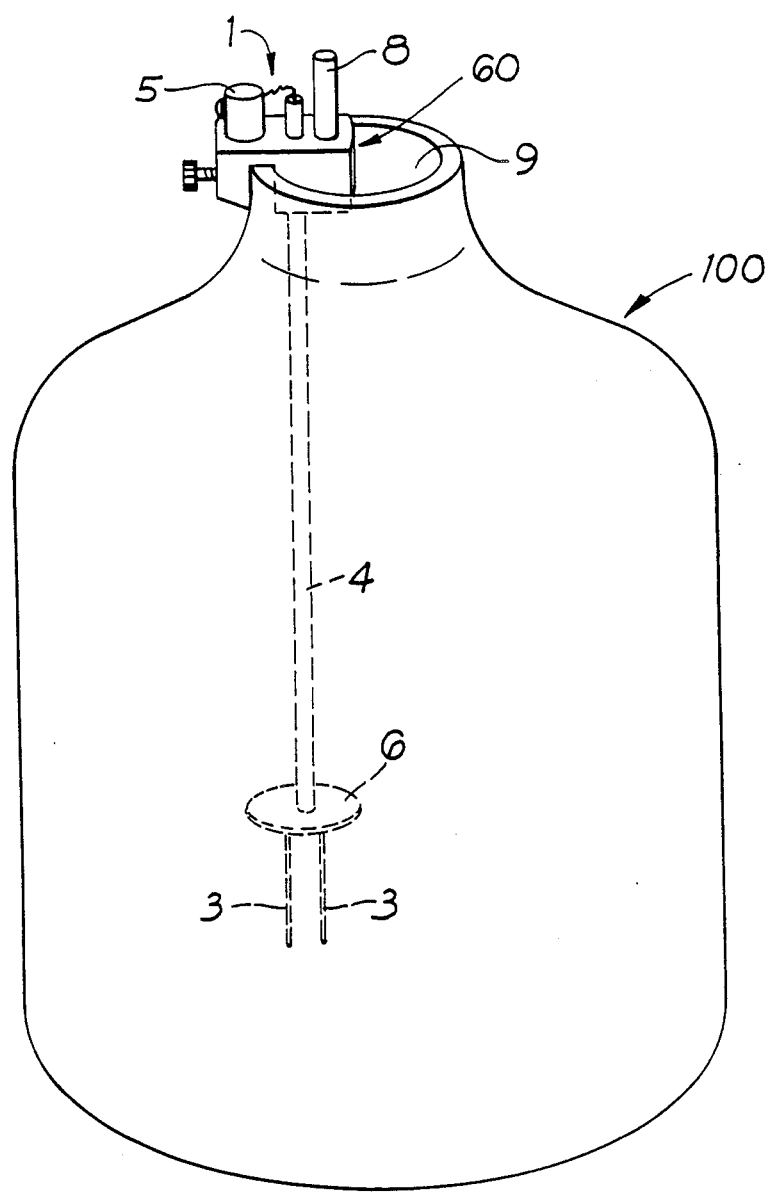
FIG. 5 is a schematic diagram showing apparatus according to this invention mounted on a vessel.

Mounting means 60 is provided to mount the indicating means and the measuring means to the vessel 100 (see FIG. 5).

Alternatively, the measuring means may be a tape measure, one end of which is attached to any chosen point on the detector means 1.

The substance, in the form of a liquid 2, may be a pharmaceutical preparation and may have foam 10 formed on the surface 11 thereof.

The operation of the invention will now be described. In order to determine the amount of liquid in a vessel, the detector means 1 is connected to a supply of electrical power (not shown) and electrodes 3 are lowered into the vessel. The electrodes are lowered until the lower ends 7 thereof contact the surface 11 of the liquid 2. An electrical circuit is thus set up between the electrodes 3 due to the conductivity of the liquid between, the liquid 2 and the lamp 5, and the lamp 5 is actuated.

Hence, the lamp 5 acts as an indicator to show that the electrodes 3 are in contact with the liquid 2 which causes the circuit to be closed thereby acting as a simple on-off switch or a relay to actuate the lamp 5 and/or leave transmitting and detector means in a manner as is well known in the art.

The distance B between the top of the vessel and the metallic plate 6 is measured by means of sonar 8. The metallic plate 6 reflects emissions from the sonar apparatus back thereto.

Distance A from the top of the vessel to the surface 11 of the liquid 2 is calculated from distances B and C. The amount of substance in the vessel is calculated from distance A.

Figure 2C:
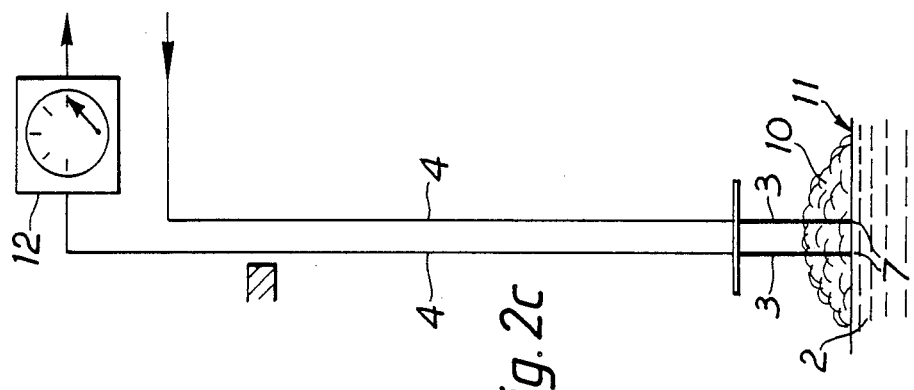
FIGS. 2a, 2b and 2c are schematic diagrams of apparatus accordance with this invention.
Figure 2B:
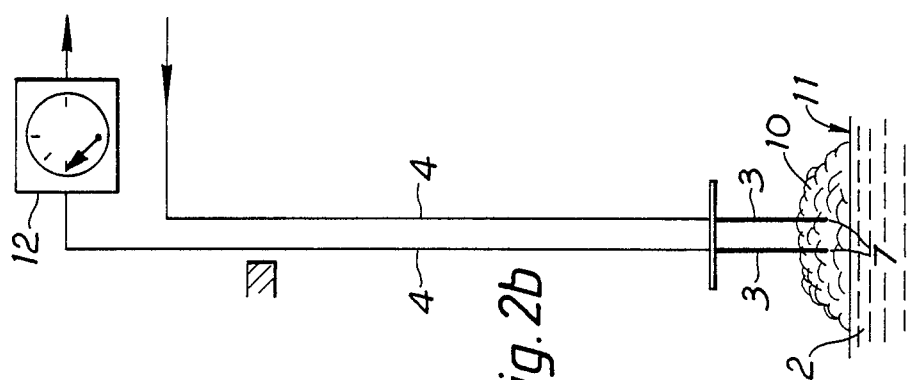
Figure 2A:
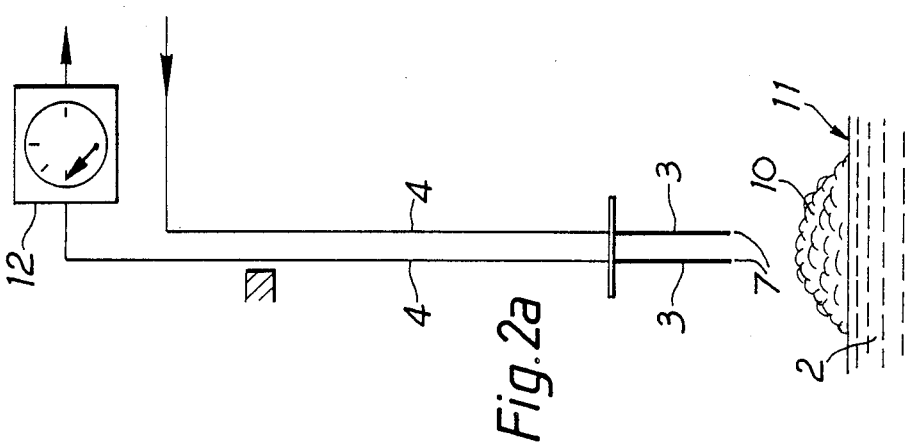

Referring to FIGS. 2a, 2b and 2c, electrodes 3 are shown connected to indicating means in the form of a meter 12. In FIG. 2a, no current is flowing while electrodes 3 are above the liquid 2 and the foam 10. In FIG. 2b, the lower ends 7 of the electrodes 3 have been lowered into the foam 10, but are still above the surface 11 of the liquid 2. Meter 12 does not register a current, indicating that the detector means ignores the foam 10 on the surface of the liquid 2.

In FIG. 2c, the meter 12 registers a current, indicating that the lower ends 7 of electrodes 3 are in contact with the surface 11 of liquid 2.

As can be seen, no circuit is set up between the electrodes 3, the meter 12 and the foam 10 on the surface 11 of the liquid 2. This means that false readings based on the foam are not obtained.

Figure 3A:
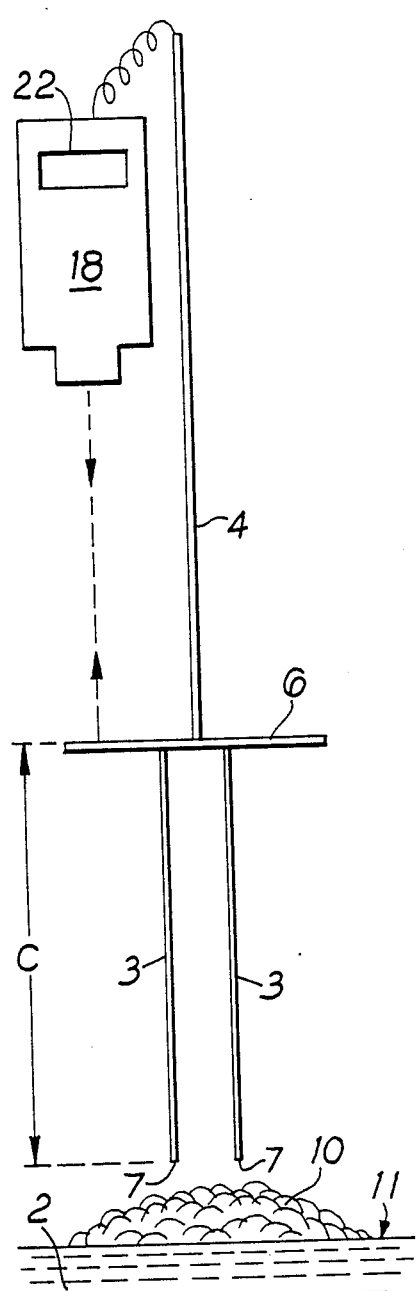
FIGS. 3a and 3b are schematic diagrams of one embodiment in accordance with this invention.
Figure 3B:
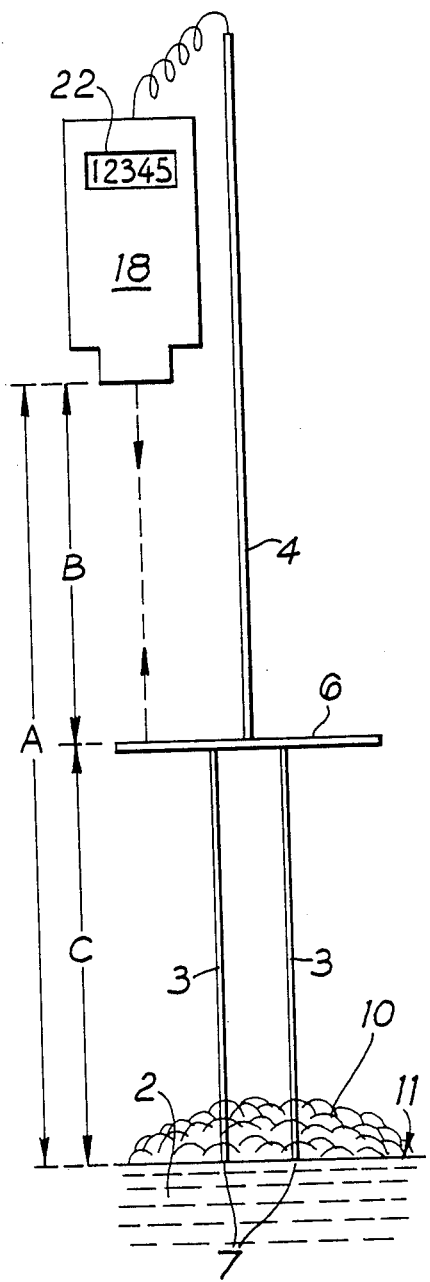

In the embodiment shown in FIGS. 3a and 3b, the sonar 18 is provided with a a meter 22 in the form of a digital readout. The sonar 18 may be arranged to be operated when the electrodes make contact with the liquid surface 11 thereby obviating the need for a separate indicator lamp.

In this embodiment, the electrodes are attached to the metallic plate 6 as before. The electrodes are connected via wires 4 directly to the sonar apparatus 18.

In FIG. 3a, the electrodes 3 are above the liquid 2 and foam 10 so that the sonar 18 is not actuated. Thus, no reading is shown on meter 22.

In FIG. 3b, the lower ends 7 of electrodes 3 are in contact with the surface 11 of the liquid 2. The sonar 18 is actuated and the meter 22 provides a readout. The readout can be the distance B but preferably the sonar is calibrated to provide a direct readout of the amount of liquid in the vessel.

Figure 4:
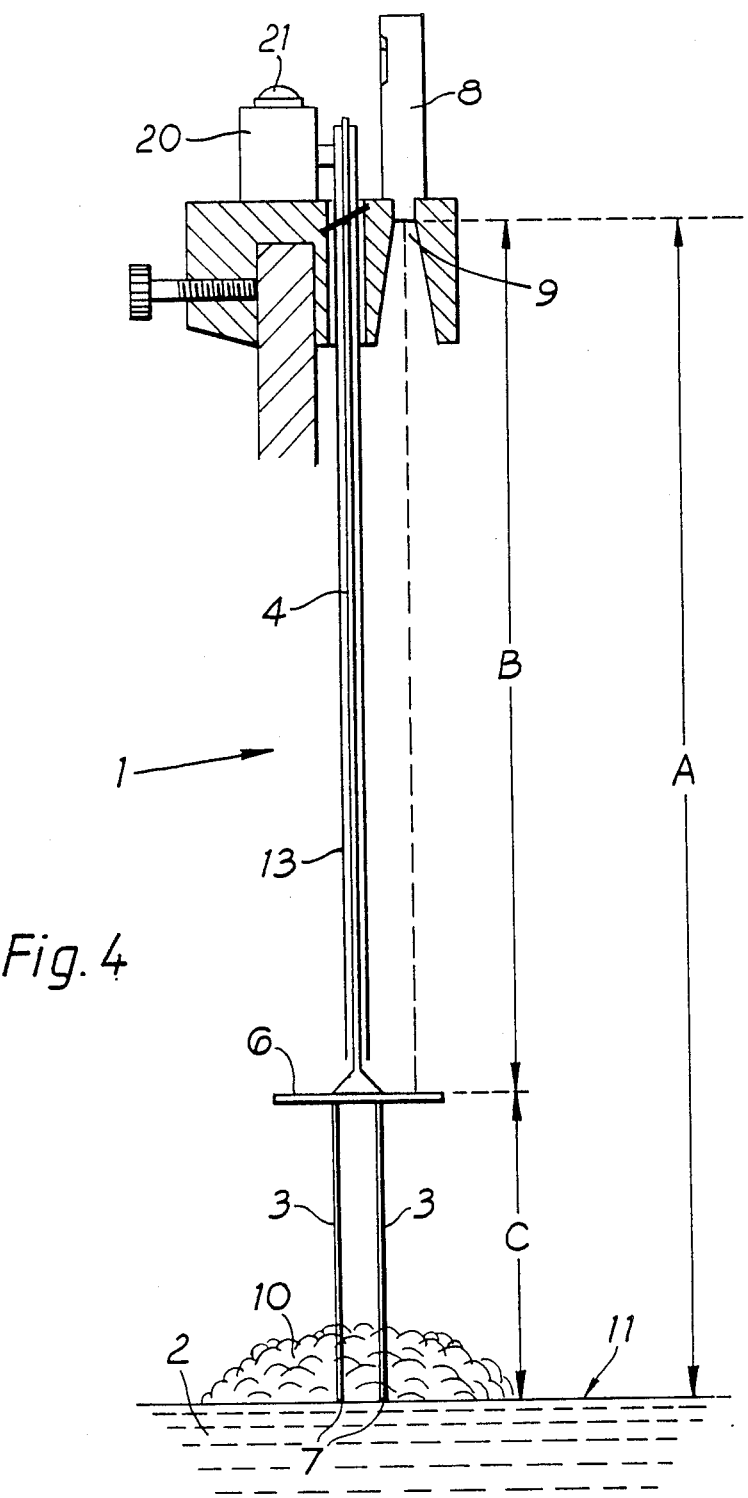
FIG. 4 is a schematic diagram of a further embodiment in accordance with the invention.

Referring to FIG. 4, apparatus according to another embodiment of this invention is shown. This apparatus is similar to that shown in FIG. 1 and the same features have been designated with the same reference numerals.

In FIG. 4, a displacement means is shown schematically at 20 for raising and lowering the electrodes; the displacement means 20 can also be provided with a lamp 21.

In operation the displacement means 20 is switched on to lower the electrodes 3 toward the surface 11. As soon as the electrodes 3 contact the surface 11 an electric current is set up which causes the displacement means 20 to be switched off and thus prevents it lowering the electrodes 3 any further. The current actuates lamp 21 to give a further indication that the electrodes have contacted the surface 11.

The calculation described for the apparatus of FIG. 4 can now be repeated.

It will be apparent that the present invention provides an improved method of determining the amount of liquid in a vessel, which is both accurate and easy to use. In addition, the invention provides a means for determining the amount of liquid in a vessel which is accurate despite the presence of foam on the surface of the liquid. Also, this invention provides the advantages that it gives a reading of the vertical distance between the surface of the liquid to the top of the vessel, it ignores the foam, it does not use any optical means of reading the height, it is easily read and it is versatile.

I claim:

1. Apparatus for determining the amount of a substance in a vessel comprising detector means adapted to be insertable in said vessel to detect the surface of the substance and indicating means, indicating when said surface is detected wherein the detector means comprises at least two electrodes supported via an elongated member and located at a distal end thereof said electrodes adapted to cause an electric current to flow upon contact of the electrodes with the surface of the substance, a wave transmitting device and a wave receiving device, a first reference point on the detector means spaced a fixed distance from the distal end of said electrodes, said electrodes and reference point being movable with respect to the surface of the substance in said vessel, said first reference point being provided on a material suitable for reflecting waves from the wave transmitting device to the wave receiving device, whereby when the detector means detects the surface of the substance the wave transmitting device and the wave receiving device an be activated to measure the distance from the first reference point to a second reference point having a known position in relation to the bottom of the vessel whereby the amount of substance in the vessel can be determined.

2. Apparatus according to claim 1 wherein the measuring means is activated in response to the signal generated when the electrodes contact the surface of the substance.

3. Apparatus according to claim 1 wherein the detector means further comprises indicating means in electrical communication with the electrodes, the indicating means being activated in response to the signal generated by contact of the electrodes with the surface of the substance.

4. Apparatus according to claim 3 which further comprises an elongate member, wherein the elongate member supports the electrodes and which elongate member is arranged between the electrodes and the indicating means.

5. Apparatus according to claim 4 wherein the electrical communication between the electrodes and the indicating means is provided by electrical wires.

6. Apparatus according to claim 5 wherein the electrical wires are enclosed within the elongate member.

7. Apparatus according to claim 3 wherein the indicating means is selected from the group comprising a lamp and a meter.

8. Apparatus according to claim 1 wherein the measuring means comprises a wave transmitting device and a wave receiving device.

9. Apparatus according to claim 8 wherein the measuring means comprises a wave transmitting device and a wave receiving device which operate on sound waves.

10. Apparatus according to claim 8 wherein the first reference point is provided on a material suitable for reflecting waves transmitted from the wave transmitting device to the wave receiving device, whereby the distance between the first reference point and the second reference point can be measured.

11. Apparatus according to claim 10 wherein the first reference point is spaced at a predetermined distance from the lower ends of the electrodes.

12. Apparatus according to claim 11 wherein the first reference point is provided on a reference plate which extends radially from the detector means.

13. Apparatus according to claim 1 which further comprises mounting means by which the apparatus can be mounted on the vessel.

* * * * *